(12) United States Patent
Reep et al.

(10) Patent No.: US 9,487,233 B2
(45) Date of Patent: Nov. 8, 2016

(54) STEERING GEAR PAD

(71) Applicant: Deere & Company, Moline, IL (US)

(72) Inventors: Kenneth M. Reep, Lincolnton, NC (US); Andrew N. Buchmann, Durham, NC (US); David W. Geiger, Raleigh, NC (US); Todd N. Thorn, Portage, WI (US)

(73) Assignee: DEERE & COMPANY, Moline, IL (US)

( * ) Notice: Subject to any disclaimer, the term of this patent is extended or adjusted under 35 U.S.C. 154(b) by 149 days.

(21) Appl. No.: 14/330,702

(22) Filed: Jul. 14, 2014

(65) Prior Publication Data

US 2016/0009315 A1    Jan. 14, 2016

(51) Int. Cl.

| | |
|---|---|
| *F16H 55/14* | (2006.01) |
| *B62D 7/22* | (2006.01) |
| *F16H 1/28* | (2006.01) |
| *F16H 55/18* | (2006.01) |
| *F16H 55/24* | (2006.01) |
| *F16H 57/12* | (2006.01) |
| *B62D 3/02* | (2006.01) |
| *B62D 7/10* | (2006.01) |
| *F16H 25/20* | (2006.01) |
| *F16H 55/28* | (2006.01) |

(52) U.S. Cl.
CPC ............ *B62D 7/226* (2013.01); *B62D 3/02* (2013.01); *B62D 7/10* (2013.01); *F16H 1/2863* (2013.01); *F16H 55/18* (2013.01); *F16H 55/24* (2013.01); *F16H 57/12* (2013.01); *F16H 25/2003* (2013.01); *F16H 55/28* (2013.01); *F16H 2055/185* (2013.01)

(58) Field of Classification Search
CPC .. F16H 1/2863; F16H 25/2003; F16H 55/18; F16H 55/24; F16H 55/28; F16H 57/12; F16H 2055/185; B63H 25/00; B62D 3/00; B62D 7/226

USPC ........ 74/89.42, 409, 440, 497; 280/91.1, 98, 280/99; 180/234, 409
See application file for complete search history.

(56) References Cited

U.S. PATENT DOCUMENTS

| | | | | |
|---|---|---|---|---|
| 3,496,802 | A * | 2/1970 | Arnold | F16H 55/16 475/180 |
| 4,241,619 | A * | 12/1980 | Cerny | F16H 55/18 101/248 |
| 4,441,735 | A | 4/1984 | Hutchison et al. | |
| 5,048,853 | A | 9/1991 | Trefz et al. | |
| 6,131,689 | A | 10/2000 | Nodorft et al. | |
| 6,189,399 | B1 * | 2/2001 | Frohnhaus | B60N 2/442 74/440 |
| 7,383,916 | B2 * | 6/2008 | Genz | B62D 7/142 180/408 |
| 2002/0042960 | A1 * | 4/2002 | Hayashi | B08B 1/04 15/93.1 |

FOREIGN PATENT DOCUMENTS

| | | |
|---|---|---|
| DE | 202010016197 U1 | 2/2011 |
| DE | 102013209641 A1 | 12/2014 |
| GB | 2399614 A | 9/2004 |

OTHER PUBLICATIONS

Search Report issued in counterpart application No. GB1512272.4, dated Jan. 18, 2016 (4 pages).

* cited by examiner

*Primary Examiner* — William Kelleher
*Assistant Examiner* — Randell J Krug

(57) ABSTRACT

A steering gear pad for a steering gear of a sector and pinion or rack and pinion steering system. The steering gear pad has a plastic body and a rim with a plurality of plastic gear teeth positioned adjacent a plurality of metal gear teeth on a sector gear or rack mounted to a support plate. The plastic gear teeth may have width dimensions larger than the metal gear teeth. One or more resilient spacers urge the steering gear out of contact with the support plate.

10 Claims, 4 Drawing Sheets

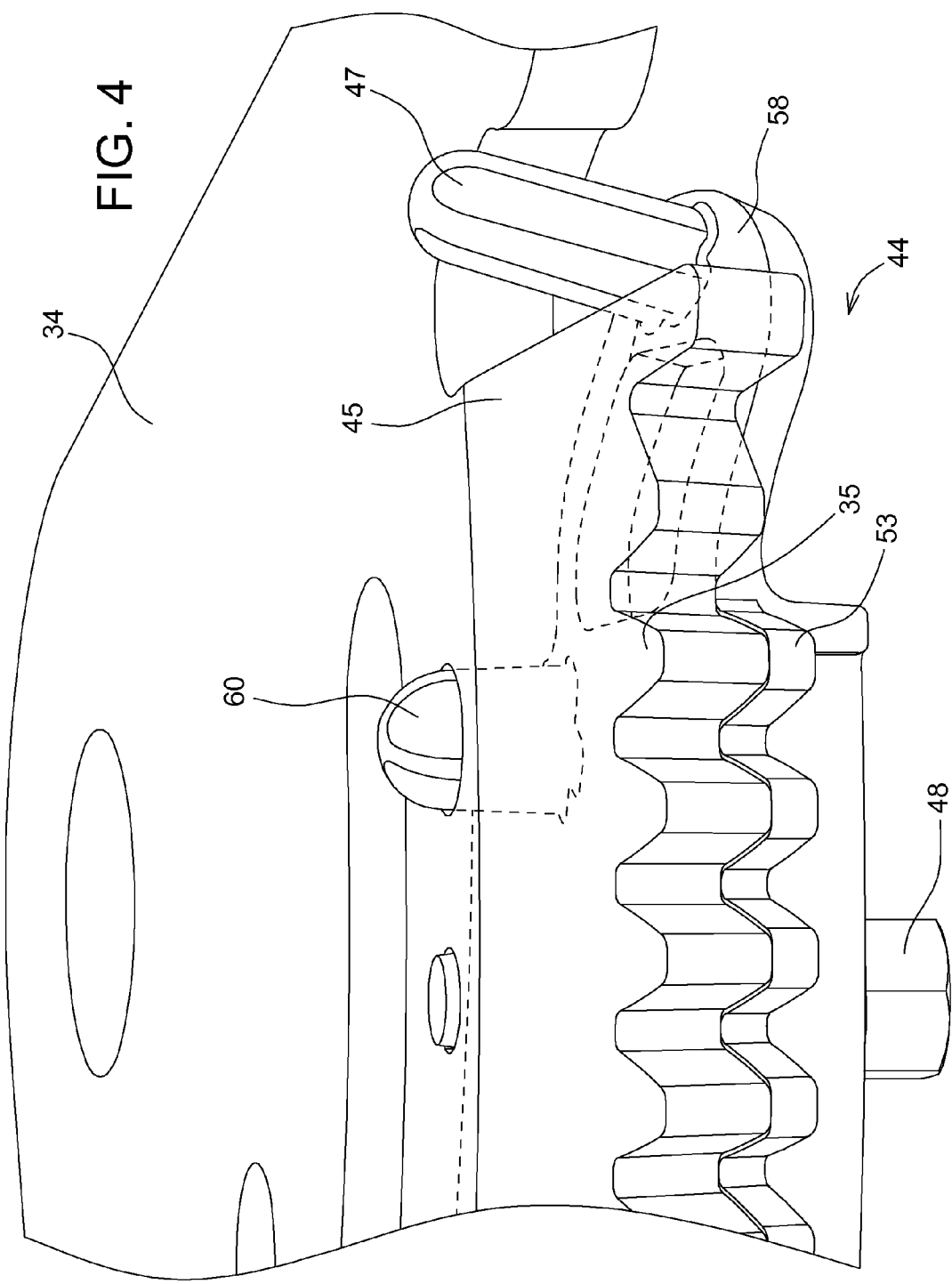

STEERING GEAR PAD

FIELD OF THE INVENTION

This invention relates generally to steering systems for lawn and garden tractors and other utility vehicles, and more specifically to reducing noise of a steering system on such a vehicle.

BACKGROUND OF THE INVENTION

Lawn and garden tractors and other utility vehicles may have sector and pinion or rack and pinion steering systems. These steering systems include a pinion gear attached to the shaft of a steering wheel, a sector gear or rack mounted to a steering mounting plate, and one or more drag links or ball joints connecting the sector gear or rack to steering arms of steerable wheels.

Sector and pinion or rack and pinion steering systems may generate noticeable and undesirable noise during operation. For example, these steering systems may have a metallic clunk as the steering wheel is quickly rocked from side to side, and a tapping noise as the steering wheel is turned back and forth.

A simple and inexpensive device is needed for reducing noise of a steering system on a lawn and garden tractor or other utility vehicle.

SUMMARY OF THE INVENTION

A steering gear pad is attached to a sector gear or rack of a steering system. The steering gear pad has plastic teeth along a rim portion corresponding to the teeth of the sector gear teeth or rack. Spacers extending from the steering gear pad limit contact between the steering gear and the support plate to which the steering gear is mounted. The steering gear pad is a simple and inexpensive device that reduces noise of a steering system on a lawn and garden tractor or other utility vehicle.

BRIEF DESCRIPTION OF THE DRAWINGS

FIG. 4 is a perspective view of a portion of a sector gear and steering gear pad with a deflected spacer according to the first embodiment.

DESCRIPTION OF THE PREFERRED EMBODIMENT

Figure 1:
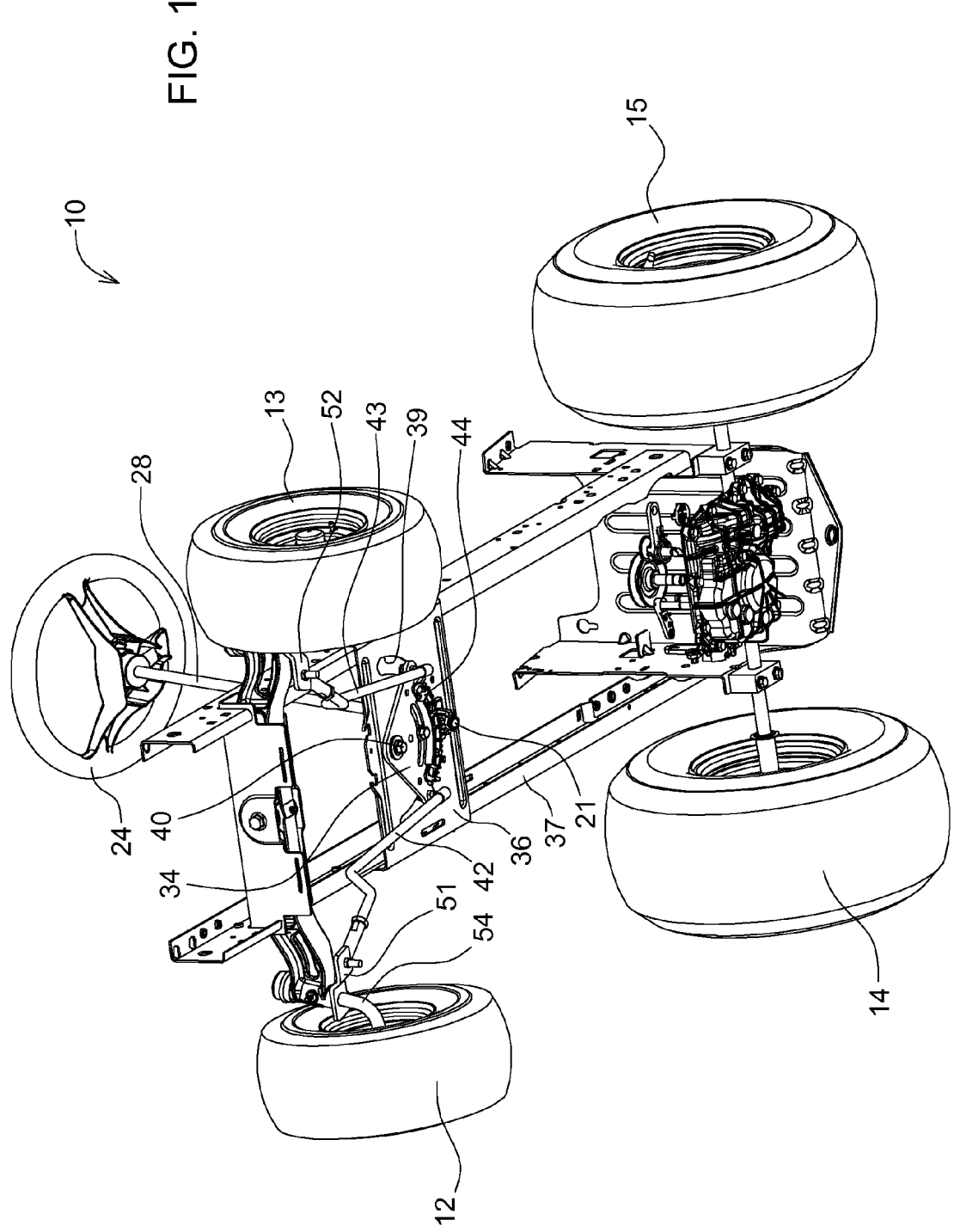
FIG. 1 is a bottom perspective view of a lawn and garden tractor frame with a steering gear pad according to a first embodiment of the invention.
Figure 2:
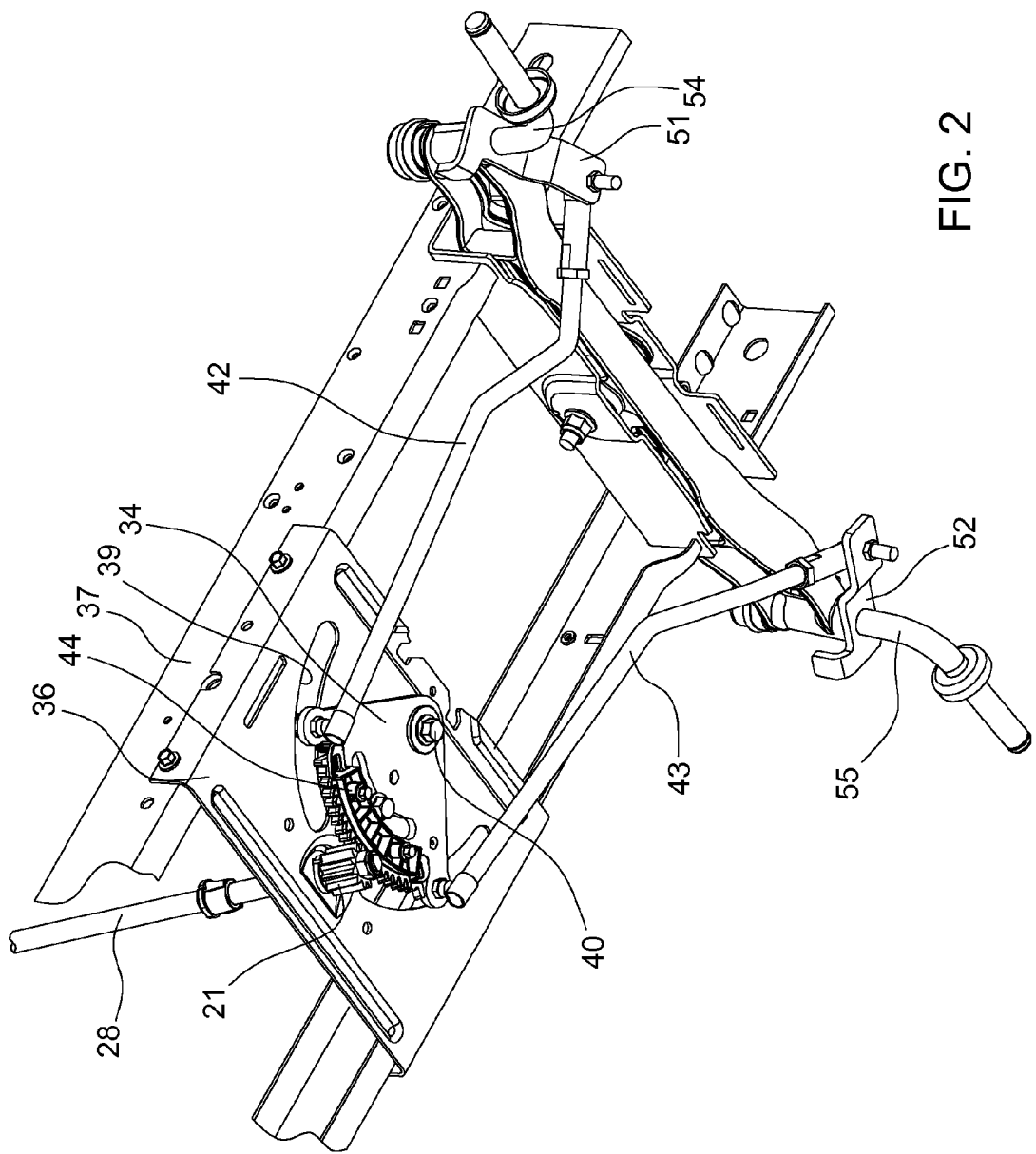
FIG. 2 is a bottom perspective view of a sector and pinion steering system with a steering gear pad according to the first embodiment.
Figure 3:
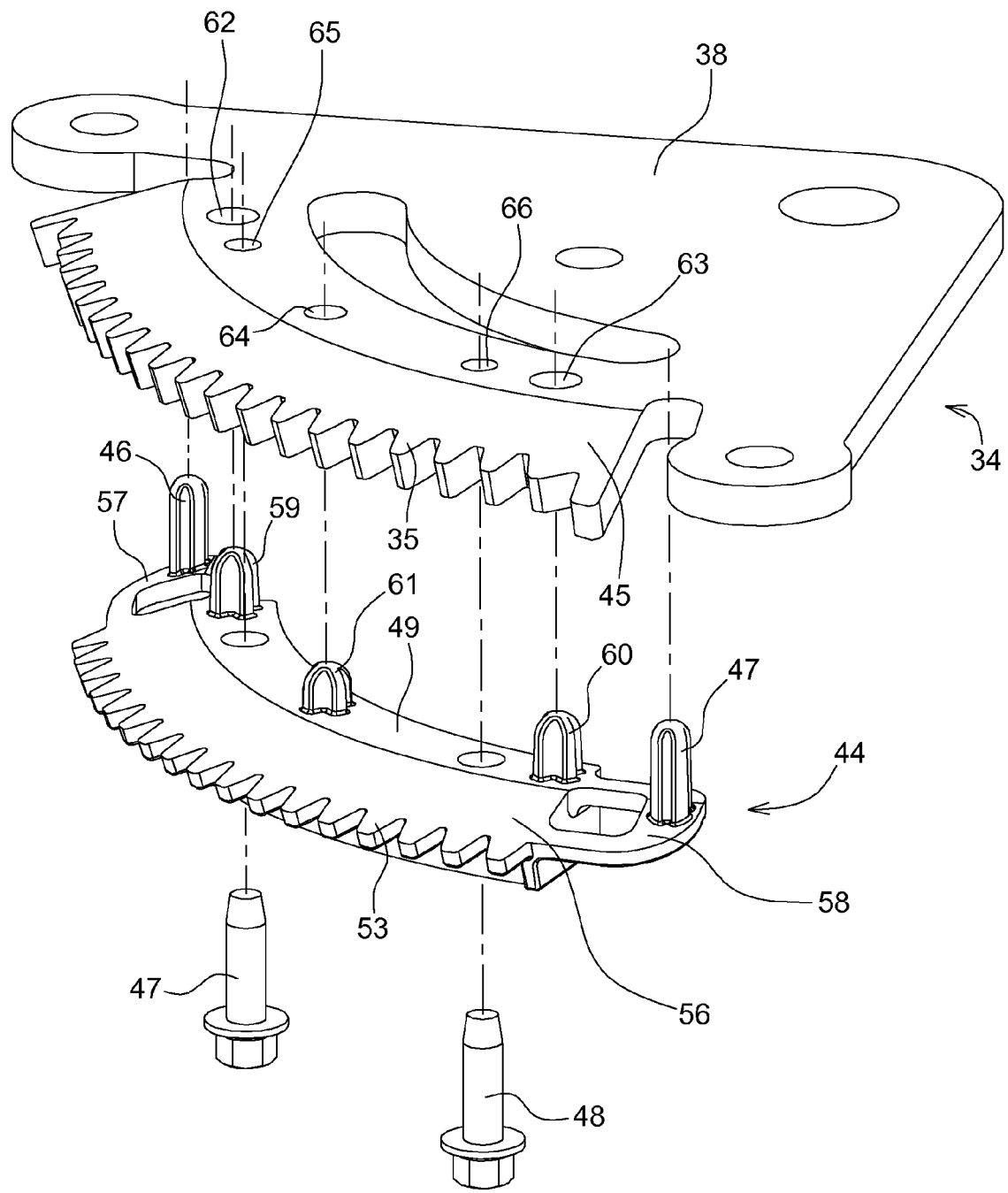
FIG. 3 is an exploded perspective view of a sector gear and steering gear pad according to the first embodiment.

In FIGS. 1-4, a sector and pinion steering system is shown on a lawn and garden tractor or other utility vehicle 10 having a pair of steerable front wheels 12, 13 and a pair of rear wheels 14, 15. The rear wheels may be driven by an engine supported at the front of the vehicle. Steering wheel 24 may be mounted in an operator station in conventional fashion such that a seated operator can steer the vehicle by turning the steering wheel.

In one embodiment, steering shaft 28 may be coupled to and extends downwardly from steering wheel 24. The steering shaft may extend through an opening in steering support plate 36 or mounting plate. At the lower end of steering shaft 28 is pinion gear 21 in mesh with sector gear 34. The sector gear has a plurality of metal gear teeth 35 along a curved rim portion 45 that may be inclined downwardly from the sector gear body 38. The sector gear may pivot on sector pin 40 with a center bearing on support plate 36. Sector pin 40 may extend through the sector gear and through an opening in support plate 36 which may be bolted or otherwise affixed to frame members 37, defining the axis about which sector gear 34 pivots. The sector pin provides some spacing between the sector gear and steering support plate, and free play in the system allows the sector gear to pivot up and down.

In one embodiment, one or more drag links may be attached to sector gear 34. For example, a first end of each of left and right drag links 42, 43 may be pivotably attached to sector gear 34. The pivot attachment points may travel along one or more curved slots 39 in support plate 36. The second end of each drag link may be pivotably attached to left and right front steering arms 51, 52, which may be operatively fixed with left and right front wheel support assemblies or spindles 54, 55 for pivoting the left and right front wheels 12, 13 during execution of a vehicle turn. As the operator turns steering wheel 24, pinion gear 21 causes sector gear 34 to pivot about the axis defined by sector pin 40. As a result, drag links 42, 43 move fore and aft to turn front steering arms 51, 52.

In one embodiment, steering gear pad 44 may be attached to sector gear 34. The steering gear pad may be attached immediately above or below the curved rim portion 45 of the sector gear. For example, the steering gear pad may be attached to the bottom surface of the rim portion of the sector gear with screws 47, 48 that engage openings 65, 66. Additionally, the steering gear pad may have one or more aligning members 59, 60, 61 that enter openings 62, 63, 64 in the sector gear. Alternatively, the steering gear pad may be secured to either the top or bottom surface of the sector gear with adhesive or other mechanical attachment means. The steering gear pad may be a resilient plastic member such as injection molded polypropylene, and may have either a solid or at least partially hollow body 49.

In one embodiment, steering gear pad 44 may have a plurality of plastic gear teeth 53 along curved rim portion 56 that may be inclined downwardly parallel to and adjacent the curved rim portion of the sector gear. All or most of the plastic steering gear pad teeth may line up with and correspond to the metal teeth 35 on sector gear 34. In one embodiment, all or most of the plastic steering gear pad teeth may have slightly larger width dimensions compared to the corresponding sector gear teeth. As a result, the horizontal surface area of a steering gear pad tooth may be up to about 10% larger than the horizontal surface area of a sector gear tooth. The steering gear pad teeth may be adjacent the sector gear teeth and may engage the pinion gear teeth and reduce the noise caused by backlash or clearance between the slightly smaller metal teeth of the sector gear and the pinion gear.

In one embodiment, steering gear pad 44 may include one or more spacers 46, 47 to reduce, limit or prevent contact between sector gear 34 and steering support plate 36. For example, the spacers may be resilient bosses that extend from the opposing ends 57, 58 of the steering gear pad, through openings in the sector gear and into contact with the support plate. The bosses may be longer than the sector gear thickness, and also may extend through the gap between the sector gear and the steering support plate, into contact with the support plate. The spacers may be sufficiently longer than the gap between the sector gear and the support plate, so that the ends 57, 58 of the steering gear pad may be forced to bend or deflect away from the support plate, as shown in FIG. 4. Thus, the spacers may be pre-loaded to resiliently urge the sector gear away from the steering support plate. The cross section area of each end portion 57, 58 of the steering gear pad may be less than the cross section area of the body 49 or curved rim portion 56 of the steering gear pad, enabling the ends to bend or deflect while the steering gear pad rim 56 and steering gear pad teeth 53 remain in place adjacent the sector gear rim 45 and sector gear teeth 35. For example, each end portion 57, 58 may be a closed loop of plastic that helps control the direction and amount of flexure of the spacers or bosses. Alternatively, the spacers may be bumpers attached to and/or between the sector gear and steering support plate to limit, prevent or minimize contact between the sector gear and support plate. Thus, the spacers reduce noise by preventing free play of the sector gear, and limiting contact of the sector gear with the steering support plate.

In a second embodiment, the steering gear pad may be provided on a lawn and garden tractor having a rack and pinion steering system with a pair of steerable front wheels. The lower end of the vehicle's steering shaft may include a pinion gear in mesh with a rack. The rack may have a plurality of metal gear teeth, and may move linearly along a support plate. One or more ball joints may connect the rack to left and right front steering arms which may be operatively fixed with left and right front wheel support assemblies or spindles for pivoting the left and right front wheels. As the operator turns the steering wheel, the pinion gear causes rack to move left or right to turn the front steering arms.

In a second embodiment, a steering gear pad may be attached to the rack, either immediately above or below the rim of the rack with adhesive or other mechanical attachment means. The steering gear pad may be a resilient plastic member such as injection molded polypropylene, and may have either a solid or at least partially hollow body. The steering gear pad may have a plurality of plastic gear teeth along a rim portion adjacent the rim portion of the rack. All or most of the plastic steering gear pad teeth may line up with and correspond to the metal teeth on the rack. All or most of the plastic steering gear pad teeth may have slightly larger width dimensions compared to the corresponding rack teeth. As a result, the horizontal surface area of a steering gear pad tooth may be up to about 10% larger than the horizontal surface area of a rack gear tooth. The steering gear pad teeth may be adjacent the rack teeth and may engage the pinion gear teeth and reduce the noise caused by backlash or clearance between the slightly smaller metal teeth of the rack and the pinion gear.

In one embodiment, the steering gear pad may include one or more spacers to reduce, limit or prevent contact between the rack and a steering support plate where the rack is mounted. For example, the spacers may be resilient bosses that extend from the opposing ends of the steering gear pad, through openings in the rack and into contact with the support plate. The bosses may be longer than the rack thickness, and also may extend through the gap between the rack and the steering support plate, into contact with the support plate. The spacers may be sufficiently longer than the gap between the rack and the support plate, so that the ends of the steering gear pad may be forced to bend or deflect away from the support plate. Thus, the spacers may be pre-loaded to resiliently urge the rack away from the steering support plate. Thus, the spacers reduce noise by preventing free play of the rack, and limiting contact of the rack with the steering support plate.

Having described the preferred embodiment, it will become apparent that various modifications can be made without departing from the scope of the invention as defined in the accompanying claims.

The invention claimed is:

1. An apparatus comprising:
   a steering gear pad attached to a steering gear and having a plurality of steering gear pad teeth along a rim portion corresponding to a plurality of steering gear teeth along a rim portion of the steering gear; and
   a plurality of spacers extending from the steering gear pad and spacing the steering gear away from a support plate to which the steering gear is pivotably mounted;
   the steering gear pad teeth each have a greater width than the steering gear teeth.

2. The apparatus of claim 1 wherein the spacers extend from opposing first and second ends of the steering gear pad that are deflected away from the steering gear and the steering support plate while the spacers contact the support plate.

3. The apparatus of claim 1 wherein the steering gear pad has a partially hollow plastic body and opposing ends having less cross section area than the partially hollow plastic body.

4. The apparatus of claim 1 wherein the spacers are bosses on the steering gear pad and extend through openings in the steering gear.

5. An apparatus comprising:
   a steering gear pad having a plastic body and a rim with a plurality of plastic gear teeth positioned adjacent a plurality of metal gear teeth on a steering gear mounted to a support plate; the plastic gear teeth having width dimensions larger than the metal gear teeth; and
   at least one resilient spacer urging the steering gear out of contact with the support plate:
   wherein the resilient spacer is a boss on an end portion of the steering gear pad.

6. The apparatus of claim 5 further comprising at least one drag link pivotably attached to the steering gear.

7. The apparatus of claim 5 wherein the steering gear pad is secured to the steering gear with mechanical fasteners.

8. The apparatus of claim 5 wherein the rim of the steering gear pad is inclined downwardly.

9. An apparatus comprising:
   a steering gear mounted to a support plate and having a plurality of steering gear teeth meshed to a pinion gear on a steering shaft; and
   a steering gear pad attached to the steering gear and having a plurality of steering gear pad teeth aligned with and adjacent the steering gear teeth, having larger dimensions than the steering gear teeth, and having a plurality of aligning members and spacers extending through openings in the steering gear; at least one of the spacers limiting contact between the steering gear and the support plate.

10. The apparatus of claim 9 wherein the spacers extend from end portions of the steering gear pad having less cross section area than a body portion of the steering gear pad, so that the end portions can deflect when the spacers contact the support plate.

* * * * *